US012615441B2

(12) United States Patent
Chen et al.

(10) Patent No.: US 12,615,441 B2
(45) Date of Patent: Apr. 28, 2026

(54) IMAGE CAPTURING DEVICE WITH ILLUMINATION BRIGHTNESS DISTRIBUTION AND ADJUSTMENT METHOD THEREOF

(71) Applicant: Chicony Electronics Co., Ltd., New Taipei City (TW)

(72) Inventors: Chien-Yueh Chen, New Taipei City (TW); Ming-Ta Chiang, New Taipei City (TW)

(73) Assignee: Chicony Electronics Co., Ltd., New Taipei City (TW)

( * ) Notice: Subject to any disclaimer, the term of this patent is extended or adjusted under 35 U.S.C. 154(b) by 28 days.

(21) Appl. No.: 18/795,191

(22) Filed: Aug. 6, 2024

(65) Prior Publication Data

US 2025/0287110 A1 Sep. 11, 2025

(30) Foreign Application Priority Data

Mar. 8, 2024 (TW) .................................. 113108593

(51) Int. Cl.
    *H04N 5/335* (2011.01)
    *H04N 23/55* (2023.01)
    *H04N 23/74* (2023.01)
(52) U.S. Cl.
    CPC ............. *H04N 23/74* (2023.01); *H04N 23/55* (2023.01)
(58) Field of Classification Search
    CPC .................................................... H04N 23/74
    See application file for complete search history.

(56) References Cited

U.S. PATENT DOCUMENTS 7,415,202 B2 * 8/2008 Fujimoto ............... G03B 15/02
                                                                    362/11
10,778,877 B2 * 9/2020 Von Cramon ......... H04N 23/51
    (Continued)

FOREIGN PATENT DOCUMENTS

CN        104718743        6/2015
CN        104755874        7/2015
WO     WO-2020043141 A1 *  3/2020  ............. H04N 23/60

OTHER PUBLICATIONS

"Office Action of Taiwan Counterpart Application", issued on Feb. 11, 2025, p. 1-p. 8.

*Primary Examiner* — Gary C Vieaux
(74) *Attorney, Agent, or Firm* — JCIPRNET

(57) ABSTRACT

An image capturing device including a substrate, a first light-emitting module, a second light-emitting module, an image capturing module, and a control module is provided. The first light-emitting module is configured to provide a first light beam with a first brightness distribution. The second light-emitting module is configured to provide a second light beam with a second brightness distribution. The image capturing module is configured to capture an environmental image illuminated by an illumination beam to obtain an image signal. The control module is electrically connected to the first light-emitting module, the second light-emitting module, and the image capturing module, and is configured to generate an adjustment signal, and adjust a current of the first light-emitting module and a current of the second light-emitting module according to the adjustment signal. In addition, an adjustment method of the image capturing device is also provided.

20 Claims, 9 Drawing Sheets

100

(56)          References Cited

U.S. PATENT DOCUMENTS

| | | | | |
|---|---|---|---|---|
| 11,184,967 | B2 * | 11/2021 | Coleman | G01S 7/4815 |
| 11,947,155 | B1 * | 4/2024 | Chen | F21V 33/0056 |
| 12,363,411 | B2 * | 7/2025 | Lin | H04N 23/667 |
| 2003/0019934 | A1 * | 1/2003 | Hunter | G06K 7/10732 |
| | | | | 235/462.2 |
| 2012/0154672 | A1 * | 6/2012 | Yamazaki | G06K 7/10732 |
| | | | | 348/370 |
| 2014/0160300 | A1 * | 6/2014 | Hung | H04N 23/56 |
| | | | | 348/164 |
| 2018/0262667 | A1 * | 9/2018 | Chen | H04N 23/71 |
| 2020/0068103 | A1 * | 2/2020 | Huang | H04N 23/54 |
| 2020/0236252 | A1 * | 7/2020 | Song | H04N 23/56 |
| 2021/0341818 | A1 * | 11/2021 | Chen | G03B 15/0442 |
| 2023/0057694 | A1 * | 2/2023 | Chen | G03B 15/05 |

* cited by examiner

100

132   122   124     140     124   122   132

120

130

132   122   124     124   122   132

100

124

R2

A2

R1

D6

D4

D5

A1

D3

122

110

D1

R2

124     122     D2     R1

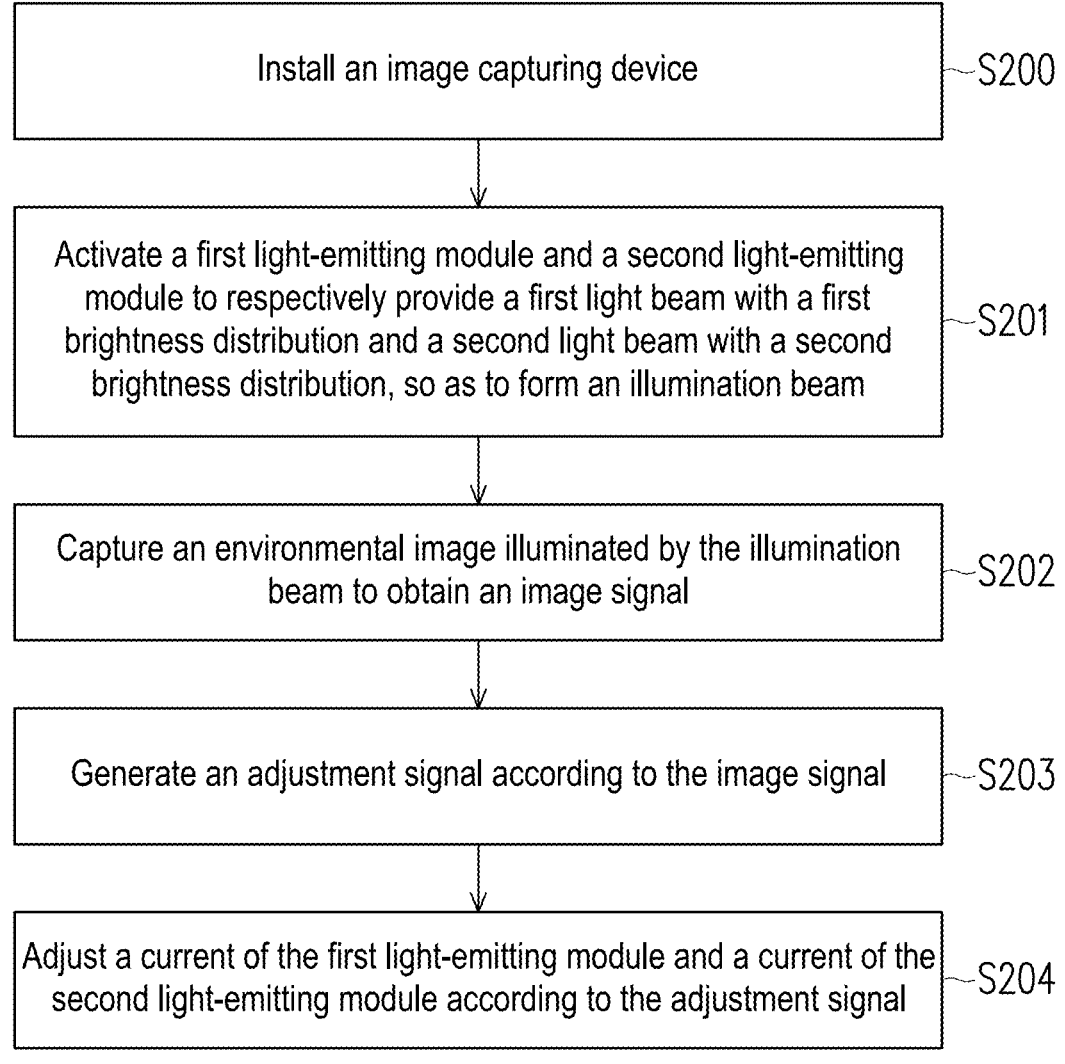

| | |
|---|---|
| Install an image capturing device | ~S200 |

| | |
|---|---|
| Activate a first light-emitting module and a second light-emitting module to respectively provide a first light beam with a first brightness distribution and a second light beam with a second brightness distribution, so as to form an illumination beam | ~S201 |

| | |
|---|---|
| Capture an environmental image illuminated by the illumination beam to obtain an image signal | ~S202 |

| | |
|---|---|
| Generate an adjustment signal according to the image signal | ~S203 |

| | |
|---|---|
| Adjust a current of the first light-emitting module and a current of the second light-emitting module according to the adjustment signal | ~S204 |

FIG. 8

IMAGE CAPTURING DEVICE WITH ILLUMINATION BRIGHTNESS DISTRIBUTION AND ADJUSTMENT METHOD THEREOF

CROSS-REFERENCE TO RELATED APPLICATION

This application claims the priority benefit of Taiwan application serial no. 113108593, filed on Mar. 8, 2024. The entirety of the above-mentioned patent application is hereby incorporated by reference herein and made a part of this specification.

BACKGROUND

Technical Field

The disclosure relates to an electronic device and a method of using the same, and particularly relates to an image capturing device and an adjustment method thereof.

Description of Related Art

At present, surveillance cameras with large viewing angles have been widely used in different situations and environments. In development of modern science and technology, wide-angle lenses, ultra-wide-angle lenses or fisheye lenses are often used to obtain camera images with a larger viewing angle. In addition, in environments with insufficient light, additional light sources will be used to illuminate the environment to enhance a monitoring effect. However, in different usage environments or different installation methods, different types of surveillance cameras need to be used to avoid problems of insufficient light or overexposure. Therefore, how to provide optimized camera effects according to different usage conditions is one of the goals in this field.

SUMMARY

The disclosure is directed to an image capturing device and an adjustment method thereof, which control a light-emitting effect according to different usage scenarios to maintain good image capturing quality.

The disclosure provides an image capturing device including a substrate, a first light-emitting module, a second light-emitting module, an image capturing module, and a control module. The first light-emitting module is disposed on the substrate to provide a first light beam with a first brightness distribution. The second light-emitting module is disposed on the substrate to provide a second light beam with a second brightness distribution. The image capturing module is disposed on the substrate and is configured to capture an environmental image illuminated by an illumination beam to obtain an image signal. The illumination beam includes the first light beam and the second light beam. The control module is electrically connected to the first light-emitting module, the second light-emitting module, and the image capturing module, and is configured to generate an adjustment signal, and adjust a current of the first light-emitting module and a current of the second light-emitting module according to the adjustment signal.

In an embodiment of the disclosure, the first light-emitting module includes a plurality of first light-emitting elements and a plurality of reflective elements. The plurality of reflective elements are respectively located between the plurality of first light-emitting elements and a center point position of the image capturing device.

In an embodiment of the disclosure, extending directions of long sides of the plurality of reflective elements are perpendicular to directions along which the plurality of first light-emitting elements are connected to the center point position of the image capturing device.

In an embodiment of the disclosure, a width of the plurality of reflective elements is five times greater than a width of the plurality of first light-emitting elements.

In an embodiment of the disclosure, a distance from a side of the plurality of reflective elements adjacent to the substrate to a center of the corresponding plurality of first light-emitting elements is less than a width of the plurality of first light-emitting elements.

In an embodiment of the disclosure, each of the plurality of reflective elements includes a first reflective surface and a second reflective surface connected with each other. The first reflective surface is located between the substrate and the second reflective surface. A first included angle between the first reflective surface and a reference plane parallel to the substrate is greater than a second included angle between the second reflective surface and the reference plane.

In an embodiment of the disclosure, the first reflective surface and the second reflective surface are both planes.

In an embodiment of the disclosure, the first included angle falls between 55 degrees and 85 degrees, and the second included angle falls between 40 degrees and 70 degrees.

In an embodiment of the disclosure, the minimum distance from a side of the first reflective surface away from the substrate to the substrate is greater than a height of the plurality of first light-emitting elements and less than twice the height of the plurality of first light-emitting elements. The minimum distance from a side of the second reflective surface away from the substrate to the substrate is greater than twice the height of the plurality of first light-emitting elements.

In an embodiment of the disclosure, the second light-emitting module includes a plurality of second light-emitting elements, and the plurality of second light-emitting elements are off-axis light-emitting diodes.

In an embodiment of the disclosure, the maximum light-emitting intensity of the light-emitting elements in the first light-emitting module is less than the maximum light-emitting intensity of the light-emitting elements in the second light-emitting module.

In an embodiment of the disclosure, the image capturing device further includes a gravity sensing element disposed on the substrate and configured to sense an installation state of the image capturing device to obtain an installation signal. The control module generates a first activation signal and a second activation signal according to the installation signal, and then respectively activates the first light-emitting module and the second light-emitting module according to the first activation signal and the second activation signal.

In an embodiment of the disclosure, in the first brightness distribution, an average brightness of a viewing angle being less than or equal to 60 degrees is less than an average brightness of a viewing angle being greater than 60 degrees. In the second brightness distribution, the average brightness of the viewing angle being less than or equal to 60 degrees is greater than the average brightness of the viewing angle being greater than 60 degrees.

The disclosure further provides an adjustment method of an image capturing device including installing the image capturing device, wherein the image capturing device includes a substrate, a first light-emitting module, a second light-emitting module, an image capturing module, and a control module; activating the first light-emitting module and the second light-emitting module to respectively provide a first light beam with a first brightness distribution and a second light beam with a second brightness distribution, so as to form an illumination beam; capturing an environmental image illuminated by the illumination beam to obtain an image signal; generating an adjustment signal according to the image signal; and adjusting a current of the first light-emitting module and a current of the second light-emitting module according to the adjustment signal.

In an embodiment of the disclosure, the step of activating the first light-emitting module and the second light-emitting module to respectively provide the first light beam and the second light beam to form the illumination beam further includes: sensing an installation state of the image capturing device to obtain an installation signal; generating a first activation signal and a second activation signal according to the installation signal; and respectively activating the first light-emitting module and the second light-emitting module according to the first activation signal and the second activation signal.

In an embodiment of the disclosure, the step of generating the first activation signal and the second activation signal according to the installation signal further includes: analysing the installation signal to generate inclination information of the image capturing device; and determining the first activation signal and the second activation signal based on the inclination information of the image capturing device, wherein the first activation signal is related to a percentage of the maximum operating current of the first light-emitting module, and the second activation signal is related to a percentage of the maximum operating current of the second light-emitting module.

In an embodiment of the disclosure, the step of generating the adjustment signal according to the image signal further includes: sensing an area in the image signal with a viewing angle less than 30 degrees to obtain a first brightness signal; sensing an area in the image signal with a viewing angle greater than 150 degrees to obtain a second brightness signal; and generating the adjustment signal based on the first brightness signal and the second brightness signal.

In an embodiment of the disclosure, the step of sensing the maximum brightness of the area with the viewing angle less than 30 degrees in the sensing image signal as the first brightness signal and sensing the maximum brightness of the area with the viewing angle greater than 150 degrees in the sensing image signal as the second brightness signal further includes: configuring a first object to be captured in an environment corresponding to the area with the viewing angle less than 30 degrees; configuring a second object to be captured in an environment corresponding to the area with the viewing angle greater than 150 degrees; sensing the maximum brightness of the first object to be captured to obtain the first brightness signal; and sensing the maximum brightness of the second object to be captured to obtain the second brightness signal.

In an embodiment of the disclosure, the first object to be captured and the second object to be captured are both white objects, and the first object to be captured is the same as the second object to be captured.

In an embodiment of the disclosure, the first brightness signal is related to the maximum brightness of the first object to be captured illuminated by the illumination beam, and the second brightness signal is related to the maximum brightness of the second object to be captured illuminated by the illumination beam.

Based on the above description, in the image capturing device and its adjustment method of the disclosure, the image capturing device includes the substrate, the first light-emitting module, the second light-emitting module, the image capturing module and the control module. The first light-emitting module is configured to provide the first light beam with the first brightness distribution, the second light-emitting module is configured to provide the second light beam with the second brightness distribution, and the control module is electrically connected to the first light-emitting module, the second light-emitting module, and the image capturing module, and configured to generate the adjustment signal based on the image signal captured by the image capturing module, and adjust the current of the first light-emitting module and the current of the second light-emitting module based on the adjustment signal, so as to form the optimized illumination beam to control a light-emitting effect of the image capturing device. In this way, the light-emitting effect may be controlled according to different usage scenarios to maintain good image capturing quality.

To make the aforementioned more comprehensible, several embodiments accompanied with drawings are described in detail as follows.

BRIEF DESCRIPTION OF THE DRAWINGS

FIG. 8 is a flowchart of steps of an adjustment method of an image capturing device according to an embodiment of the disclosure.

DESCRIPTION OF THE EMBODIMENTS

Figure 1:
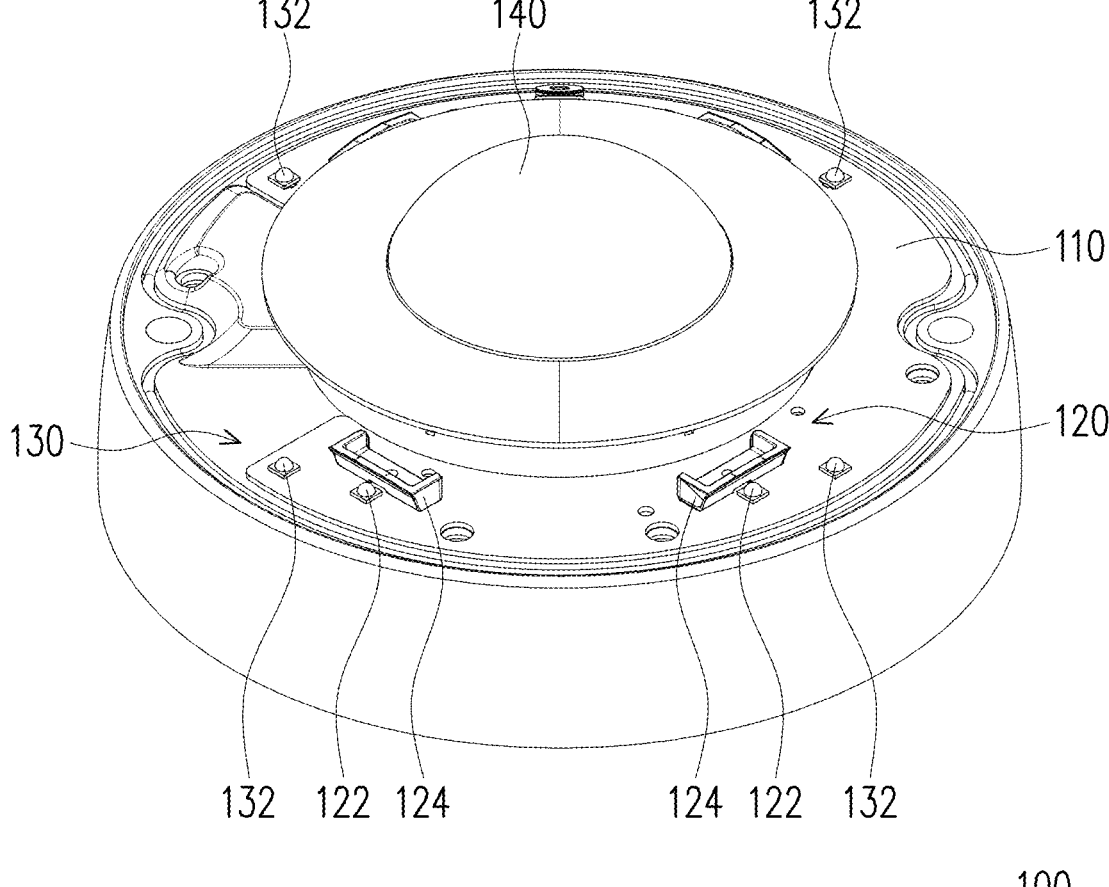
FIG. 1 is a schematic three-dimensional view of an image capturing device according to an embodiment of the disclosure.

For the convenience and clarity of explanation, a thickness or size of each component in the drawings is expressed in an exaggerated, omitted, or schematic manner for the understanding and reading of those familiar with this art, and the size of each component is not completely an actual size, and is not used to limit the conditions for the implementation of the disclosure, so that it has no technical substantive significance, and any structural modifications, changes in proportion, or adjustments in size, without affecting the efficacy and objectives that may be achieved by the disclosure, shall still fall within the scope of the technical content disclosed in the disclosure. The same reference numbers will be used throughout the drawings to refer to the same or similar components.

Figure 2:
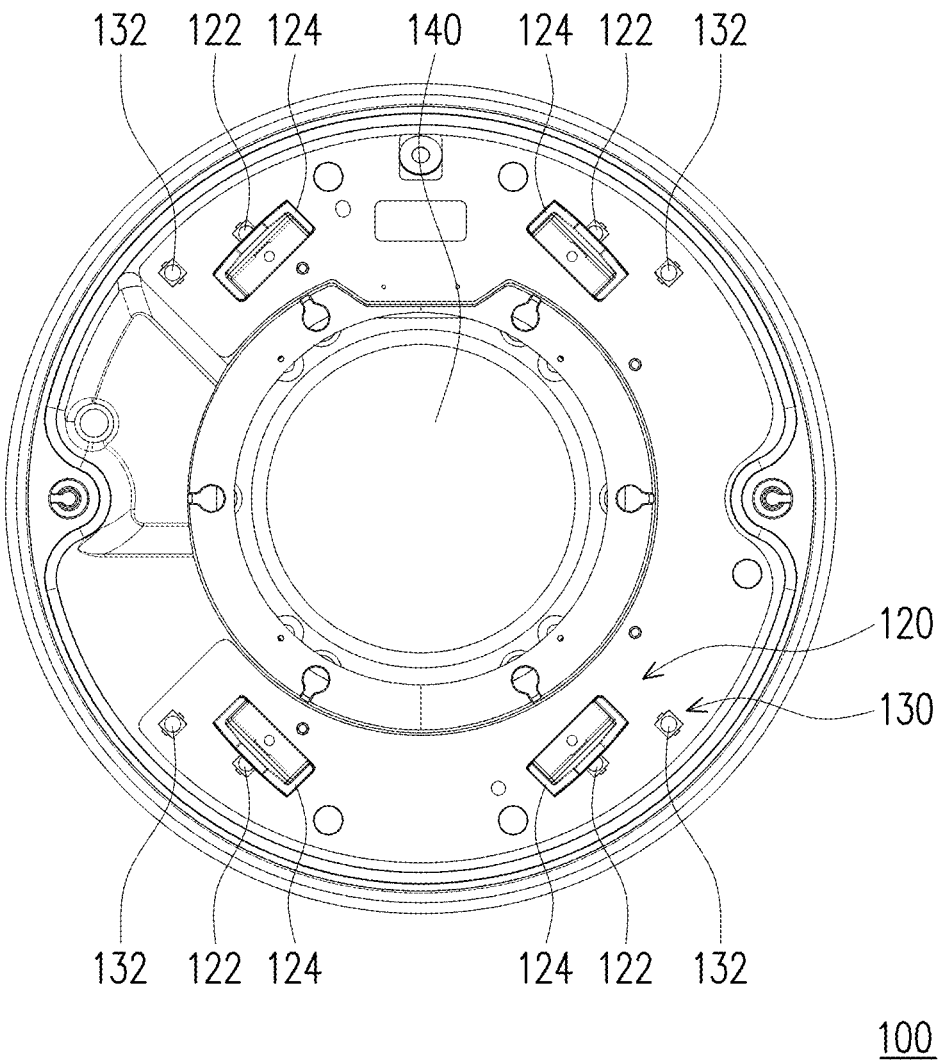
FIG. 2 is a schematic top view of the image capturing device of FIG. 1.

FIG. 1 is a schematic three-dimensional view of an image capturing device according to an embodiment of the disclosure. FIG. 2 is a schematic top view of the image capturing device of FIG. 1. Referring to FIG. 1 and FIG. 2, the embodiment provides an image capturing device 100, which includes a substrate 110, a first light-emitting module 120, a second light-emitting module 130, an image capturing module 140, and a control module. The image capturing device 100 is, for example, an ultra-wide-angle camera or a panoramic camera, which is suitable for being disposed on a ceiling of an indoor space to capture indoor environmental images, or disposed in an outdoor space to capture outdoor environmental images. In the embodiment, the first light-emitting module 120, the second light-emitting module 130, and the image capturing module 140 are all disposed on the substrate 110, and the control module (not shown) is electrically connected to the first light-emitting module 120, the second light-emitting module 130, and the image capturing module 140, and control a light-emitting effect of the image capturing device 100, so that the light-emitting effect may be controlled according to different usage scenarios to maintain good image capturing quality. In the embodiment, the substrate 110 is, for example, a circuit board or a casing. Namely, in different embodiments, the first light-emitting module 120 and the second light-emitting module 130 may be configured on different substrates from the image capturing module 140.

Figure 3:
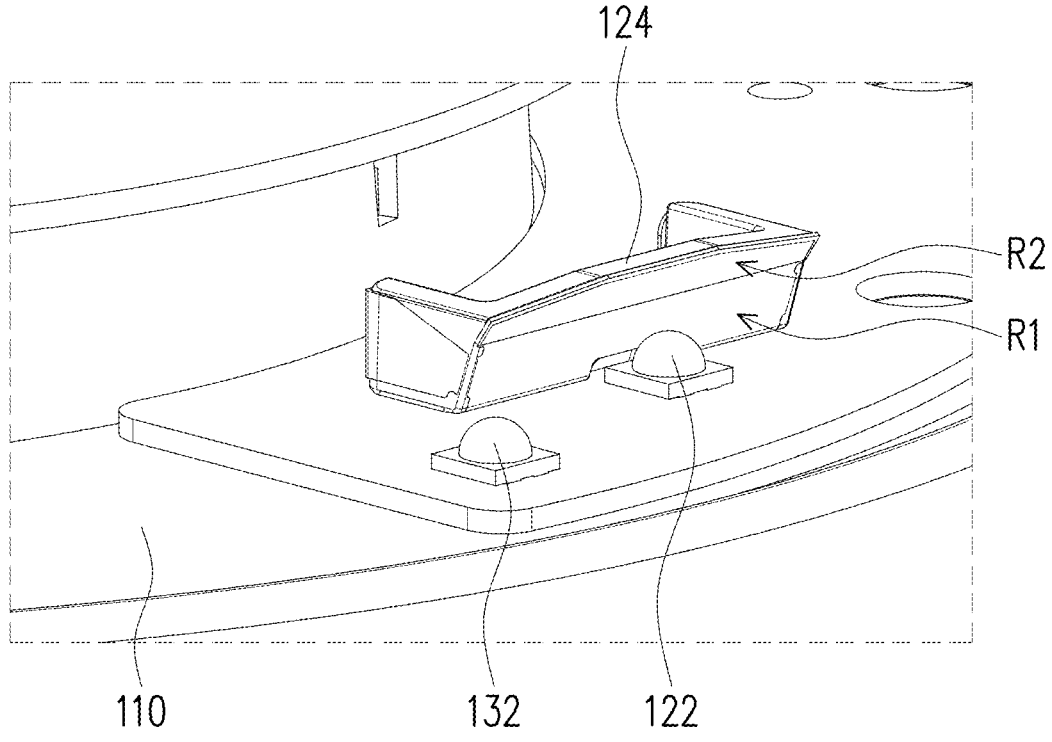
FIG. 3 is a schematic three-dimensional partial enlarged view of the image capturing device in FIG. 1.
Figures 4, 5:
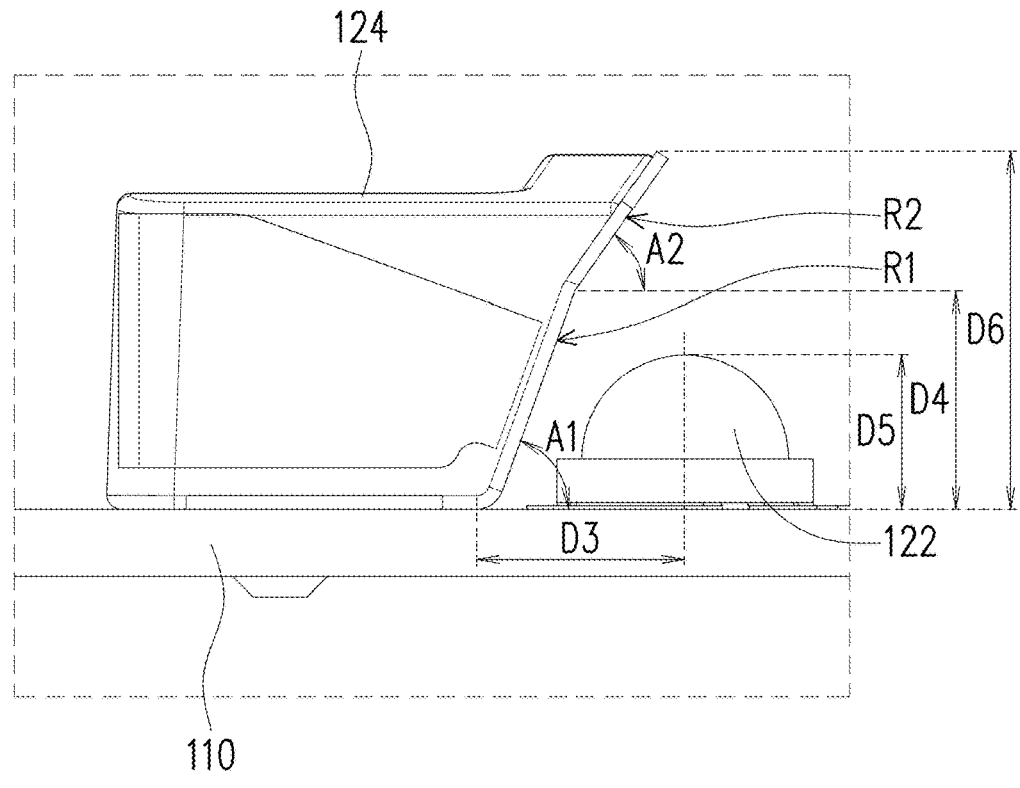
FIG. 4 is a schematic side view of a first light source module of the image capturing device in FIG. 1.
FIG. 5 is a schematic front view of the first light source module of the image capturing device in FIG. 1.

FIG. 3 is a schematic three-dimensional partial enlarged view of the image capturing device in FIG. 1. FIG. 4 is a schematic side view of a first light source module of the image capturing device in FIG. 1. FIG. 5 is a schematic front view of the first light source module of the image capturing device in FIG. 1. Refer to FIG. 3 to FIG. 5. The first light-emitting module 120 includes a plurality of first light-emitting elements 122 and a plurality of reflective elements 124. The plurality of first light-emitting elements 122 may be, for example, light-emitting diodes. In some embodiments, the plurality of first light-emitting elements 122 are, for example, off-axis infrared light-emitting diodes for providing infrared light beams. For example, the first light-emitting element 122 is an off-axis infrared light-emitting diode with maximum light intensity in a positive 57-degree direction of an X-axis and maximum light intensity in a 0-degree direction of a Y-axis. However, the disclosure is not limited thereto. Through this off-axis characteristic, the emitted light beam may be emitted in a specific direction, thereby increasing the controllability of the light-emitting direction and improving usage convenience. The plurality of reflective elements 124 are respectively located between the plurality of first light-emitting elements 122 and a center point position of the image capturing device 100, and extending directions of long sides of the plurality of reflective elements 124 are perpendicular to directions along which the plurality of first light-emitting elements 122 are connected to the center point position of the image capturing device 100, as shown in FIG. 3. A number of the first light-emitting elements 122 is the same as a number of the reflective elements 124, and each first light-emitting element 122 matches the corresponding reflective element 124. In the embodiment, the number of the plurality of first light-emitting elements 122 and the number of the plurality of reflective elements 124 are, for example, four groups, which are symmetrically arranged, but the disclosure is not limited thereto. In some embodiments, one reflective element 124 may be matched with two or more first light-emitting elements 122, which is not limited by the disclosure. In different embodiments, outer shapes of the plurality of reflective elements 124 may be designed to be squares or non-rectangular shapes, and the extending directions of the short sides of the reflective elements 124 may be designed to be perpendicular to directions along which the plurality of first light-emitting elements 122 are connected to the center point position of the image capturing device 100 or have no specific symmetrical design. Namely, the plurality of reflective elements 124 may be customized in different designs according to the characteristics and lighting requirements of the plurality of first light-emitting elements 122, which is not limited by the disclosure.

Figure 6A:
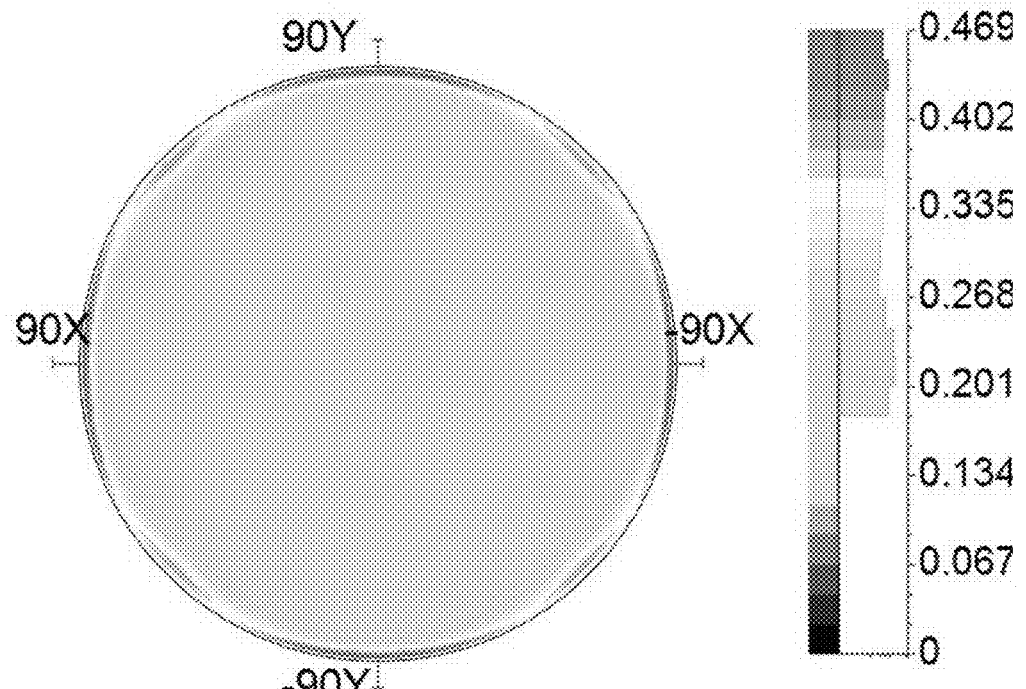
FIG. 6A and FIG. 6B are respectively a light intensity distribution diagram and a light intensity curve diagram of a first light beam.
Figure 6B:
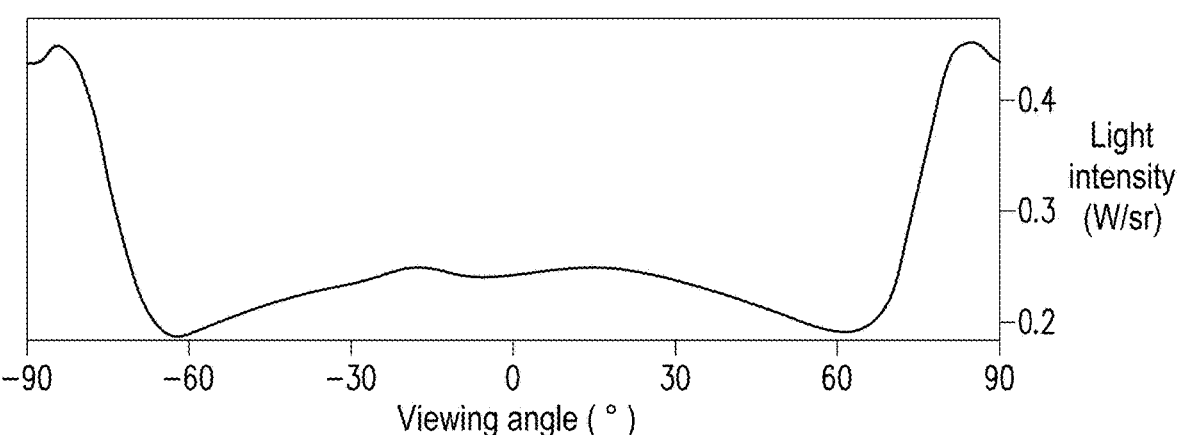

FIG. 6A and FIG. 6B are respectively a light intensity distribution diagram and a light intensity curve diagram of a first light beam. Where, 90X in FIG. 6A represents a positive 90-degree position in the X direction, −90X represents a negative 90-degree position in the X direction, 90Y represents a positive 90-degree position in the Y direction, and −90Y represents a negative 90-degree position in the Y direction. Referring to FIG. 3 to FIG. 6B, in the embodiment, since the plurality of reflective elements 124 are respectively located between the plurality of first light-emitting elements 122 and the center point position of the image capturing device 100, through the reflection of the plurality of reflective elements 124, the light beams emitted by the plurality of first light-emitting elements 122 will not directly reach the center point position of the image capturing device 100, so that the first light-emitting module 120 provides the first light beam with a first brightness distribution (i.e., a light intensity at a small viewing angle is less than a light intensity at a large viewing angle). In a preferred embodiment, the first light-emitting module 120 provides the first light beam with the first brightness distribution. In the first brightness distribution, an average brightness when the viewing angle is less than or equal to 60 degrees is less than an average brightness when the viewing angle is greater than 60 degrees, as shown in FIG. 6A and FIG. 6B.

More specifically, in the embodiment, a width D1 of the reflective element 124 is five times greater than a width D2 of the first light-emitting element 122. For example, the width D1 of the reflective element 124 is, for example, 19.5 millimeters (mm), and the width D2 of the first light-emitting element 122 is, for example, 3.8 mm, but the disclosure is not limited thereto. In addition, a distance D3 from a side of the reflective element 124 adjacent to the substrate 110 to a center of the corresponding first light-emitting element 122 is less than the width D2 of the first light-emitting element 122. For example, the distance D3 from the side of the reflective element 124 adjacent to the substrate 110 to the center of the corresponding first light-emitting element 122 is, for example, 2.81 mm, and the width D2 of the first light-emitting element 122 is, for example, 3.8 mm, but the disclosure is not limited thereto. In addition, in the embodiment, each reflective element 124 may also be designed to include a first reflective surface R1 and a second reflective surface R2 connected to each other. Where, the first reflective surface R1 is located between the substrate 110 and the second reflective surface R2. The first reflective surface R1 and the second reflective surface R2 are both planes. However, in different embodiments, the first reflective surface R1 and the second reflective surface R2 may also be designed as curved surfaces, which is not limited by the disclosure. The minimum distance D4 from a side of the first reflective surface R1 away from the substrate 110 to the substrate 110 is greater than a height D5 of the first light-emitting element 122 and less than twice the height D5 of the first light-emitting element 122. For example, the minimum distance D4 from the side of the first reflective surface R1 away from the substrate 110 to the substrate 110 is, for example, 3.24 mm, and the height D5 of the first light-emitting element 122 is, for example, 2.3 mm. The minimum distance D6 from a side of the second reflective surface R2 away from the substrate 110 to the substrate 110 is greater than twice the height D5 of the plurality of first light-emitting elements 122. For example, the minimum distance D6 from the side of the second reflective surface R2 away from the substrate 110 to the substrate 110 is, for example, 5.20 mm, and the height D5 of the first light-emitting element 122 is, for example, 2.3 mm. However, in different embodiments, the heights and widths of the plurality of reflective elements 124 may be customized in different designs according to the characteristics and lighting requirements of the plurality of first light-emitting elements 122, which is not limited by the disclosure.

It should be noted that a first included angle A1 between the first reflective surface R1 and a reference plane parallel to the substrate 110 is greater than a second included angle A2 between the second reflective surface R2 and the reference plane. For example, the first included angle A1 falls between 55 degrees and 85 degrees, and the second included angle A2 falls between 40 degrees and 70 degrees. In this way, the design of the reflective elements 124 may effectively concentrate and reflect the light beams emitted by the first light-emitting elements 122 to a range of the maximum viewing angle, so as to form the light intensity distribution as shown in FIG. 6A and FIG. 6B. In a preferred embodiment, the first included angle A1 is designed to be 70 degrees, and the second included angle A2 is designed to be 55 degrees, but the disclosure is not limited thereto.

Continue to refer to FIG. 1 to FIG. 3. The second light-emitting module 130 is disposed on the substrate 110 and includes a plurality of second light-emitting elements 132. Different from the first light-emitting module 120, the second light-emitting module 130 does not have reflective elements. The plurality of second light-emitting elements 132 are similar to the plurality of first light-emitting elements 122, which are, for example, off-axis infrared light-emitting diodes, for providing infrared light beams. For example, the second light-emitting element 132 is an off-axis infrared light-emitting diode with maximum light intensity in a specific angular direction in a specific axial direction, but the disclosure is not limited thereto. Through this off-axis characteristic, the emitted light beam may be emitted in a specific direction, thereby increasing the controllability of the light-emitting direction and improving usage convenience. In the embodiment, the maximum light-emitting intensity of the light-emitting elements (i.e., the plurality of first light-emitting elements 122) in the first light-emitting module 120 may be designed to be less than the maximum light-emitting intensity of the light-emitting elements (i.e., the plurality of second light-emitting elements 132) in the second light-emitting module 130, but the disclosure is not limited thereto. In the embodiment, the number of the plurality of second light-emitting elements 132 is similar to the number of the plurality of first light-emitting elements 122, for example, four groups, arranged symmetrically, but the disclosure is not limited thereto.

Figure 7A:
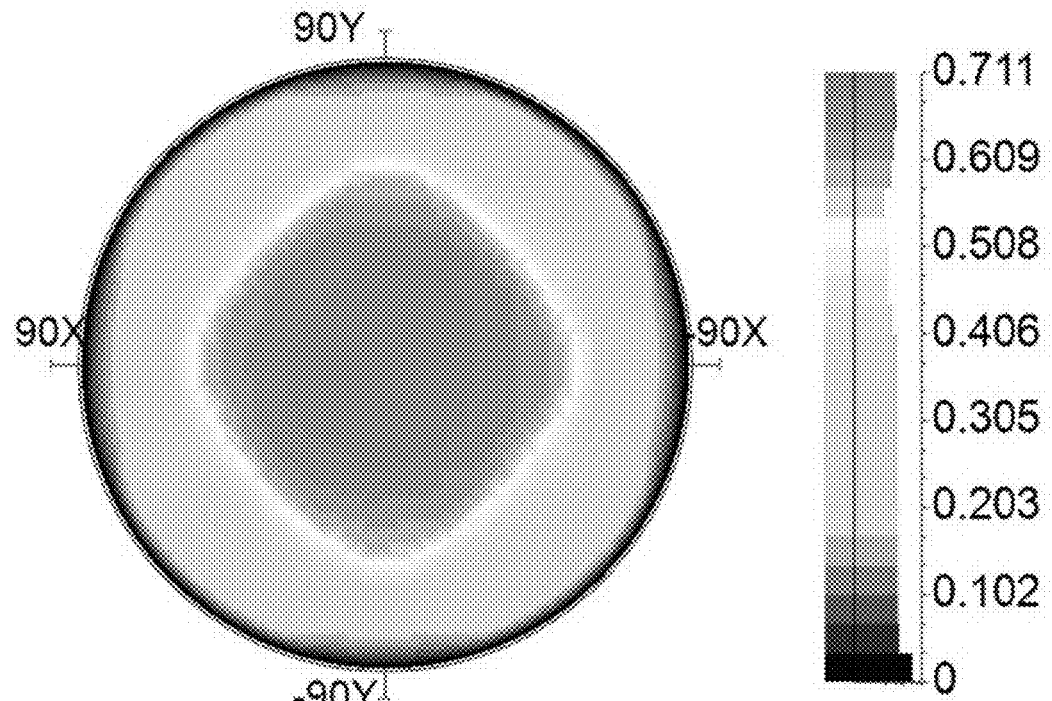
FIG. 7A and FIG. 7B are respectively a light intensity distribution diagram and a light intensity curve diagram of a second light beam.
Figure 7B:
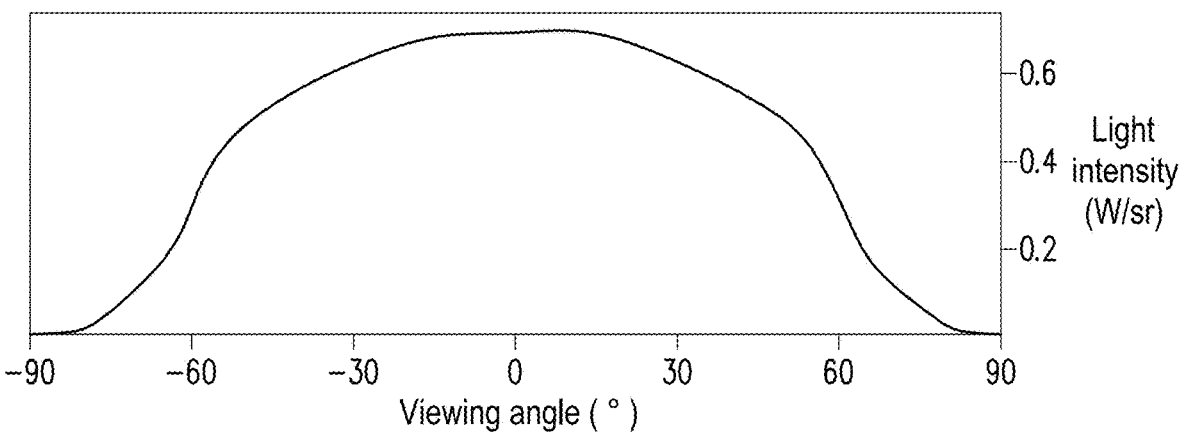

FIG. 7A and FIG. 7B are respectively a light intensity distribution diagram and a light intensity curve diagram of the second light beam. Referring to FIG. 3, FIG. 7A and FIG. 7B, in the embodiment, since there are no reflective elements in the plurality of second light-emitting modules 130, the light beams emitted by the plurality of second light-emitting elements 132 will present an original light-emitting distribution of the light-emitting elements, thereby allowing the second light-emitting module 130 to provide a second light beam with a second brightness distribution (i.e., the light intensity at the small viewing angle is greater than the light intensity at the large viewing angle). In a preferred embodiment, the second light-emitting module 130 provides the second light beam with a second brightness distribution. Where, in the second brightness distribution, an average brightness when the viewing angle is less than or equal to 60 degrees is greater than an average brightness when the viewing angle is greater than 60 degrees, as shown in FIG. 7A and FIG. 7B. In other words, the light intensity distribution of the first light beam is different from the light intensity distribution of the second light beam.

Continue to refer to FIG. 1 and FIG. 2. In the embodiment, the image capturing module 140 is disposed on the substrate 110 to capture an environmental image illuminated by an illumination beam to obtain an image signal. The illumination beam includes the above-mentioned first light beam and the second light beam. The image capturing module 140 includes, for example, an optical lens and a light sensing element. The optical lens is, for example, a wide-angle lens, an ultra-wide-angle lens or a fisheye lens, and the light sensing element is, for example, a charge coupled device (CCD) or a complementary metal oxide semiconductor transistor (CMOS), which is not limited by the disclosure.

The control module (not shown) is electrically connected to the first light-emitting module 120, the second light-emitting module 130, and the image capturing module 140, and is configured to generate an adjustment signal according to the image signal obtained by the image capturing module 140, and adjust a current of the first light-emitting module 120 and a current of the second light-emitting module 130 according to the adjustment signal, so as to adjust a ratio of the first light beam and the second light beam to adjust the illumination beam, thereby achieving a purpose of controlling a light-emitting effect of the image capturing device 100. The control module is, for example, a central processing unit (CPU), or other programmable general-purpose or special-purpose microprocessor, digital signal processor (DSP), programmable chemical controller, application specific integrated circuit (ASIC) or other similar components or a combination of the above components, which is not limited by the disclosure. In this way, the image capturing device 100 may control the light-emitting effect according to different usage scenarios to maintain good image capturing quality. Detailed adjustment implementation will be explained in subsequent paragraphs.

In the embodiment, the image capturing device 100 further includes a gravity sensing element (not shown), which is disposed on the substrate 110 and electrically connected to the control module to sense an installation state of the image capturing device 100 to obtain an installation signal, and transmits the installation signal to the control module. For example, the gravity sensing element is a gravity sensor, and the installation state is, for example, a state that the image capturing device 100 is installed on a ceiling of an indoor space or installed on a wall of the outdoor space. In the embodiment, the control module generates a first activation signal and a second activation signal according to the installation signal sensed by the gravity sensing element, and then respectively activates the first light-emitting module and the second start signal based on the first activation signal and the second activation signal. For example, when the image capturing device 100 is installed on the ceiling of the indoor space, through a sensing result of the gravity sensing element, the control module generates the first activation signal in which a current ratio of the first light source module 120 is greater than a current ratio of the second light source module 130, so that a proportion of the first light beam in the illumination beam is greater than that of the second light beam, thereby adapting to the indoor environment and maintaining good image capturing quality of the image capturing device 100. When the image capturing device 100 is installed on the wall of the outdoor space, through the sensing result of the gravity sensing element, the control module generates the second activation signal in which the current ratio of the first light source module 120 is less than the current ratio of the second light source module 130, so that the proportion of the first light beam in the illumination beam is less than that of the second light beam, thereby adapting to the outdoor environment and maintaining good image capturing quality of the image capturing device 100.

FIG. 8 is a flowchart of steps of an adjustment method of an image capturing device according to an embodiment of the disclosure. Referring to FIG. 1 and FIG. 8, the adjustment method of an image capturing device of the embodiment may be applied to at least the image capturing device 100 shown in FIG. 1, which is taken as an example in the following description. However, those with ordinary knowledge in the technical field of the disclosure may understand that the adjustment method of the image capturing device according to the embodiment of the disclosure is not limited to be applied to the image capturing device 100 in FIG. 1, nor is it limited to the sequence of various steps in the flowchart of FIG. 8. In the adjustment method of the image capturing device 100 in the embodiment, step S200 is first performed to install the image capturing device 100. The image capturing device 100 includes the substrate 110, the first light-emitting module 120, the second light emitting module 130, the image capturing module 140 and the control module.

Then, after the above steps, step S201 is performed to activate the first light-emitting module 120 and the second light-emitting module 130 to respectively provide the first light beam with the first brightness distribution and the second light beam with the second brightness distribution, thereby forming the illumination beam. Where, in a preferred embodiment, in the first brightness distribution, the average brightness with the viewing angle less than or equal to 60 degrees is less than the average brightness with the viewing angle greater than 60 degrees, and in the second brightness distribution, the average brightness with the viewing angle less than or equal to 60 degrees is greater than the average brightness with the viewing angle greater than 60 degrees. For example, the control module is used to activate the first light-emitting module 120 and the second light-emitting module 130. In an embodiment, the method of step S201 further includes a step of activating the first light-emitting module 120 with 50% of the maximum operating current of the first light-emitting module 120, and a step of activating the second light-emitting module 130 with 50% of the maximum operating current of the second light-emitting module 130. In other words, before starting to adjust the image capturing device 100, 50% of the maximum operating current of the first light-emitting module 120 and 50% of the maximum operating current of the second light-emitting module 130 may be first provided, respectively, to activate the first light-emitting module 120 and the second light-emitting module 130 to form an initial illumination beam.

In addition, in an embodiment of the image capturing device 100 configured with a gravity sensing element, after the above steps, the adjustment method may further include a step of sensing the installation state of the image capturing device 100 to obtain the installation signal, a step of generating the first activation signal and the second activation signal according to the installation signal, and a step of respectively activating the first light-emitting module 120 and the second light-emitting module 130 according to the first activation signal and the second activation signal. Specifically, the step of generating the first activation signal and the second activation signal according to the installation signal may further include a step of analyzing the installation signal to generate inclination information of the image capturing device 100, and a step of determining the first activation signal and the second activation signal based on the inclination information of the image capturing device 100. The first activation signal is related to a percentage of the maximum operating current of the first light-emitting module 120, and the second activation signal is related to a percentage of the maximum operating current of the second light-emitting module 130. In other words, after activating the image capturing device 100, the installation state of the image capturing device 100 may be further sensed to determine an installation position of the image capturing device 100, and then a current magnitude of the first light-emitting module 120 and a current magnitude of the second light-emitting module 130 may be adjusted to change an initial illumination beam into an illumination beam that is more suitable for the environment, but the disclosure is not limited thereto. In the embodiment, the above-mentioned inclination information covers, for example, all angle ranges from ceiling mount to wall mount. After the above steps, step S202 is executed to capture the environmental image illuminated by the illumination beam to obtain the image signal. For example, the image capturing module 140 is used to capture the environmental image to obtain the image signal.

Figure 9:
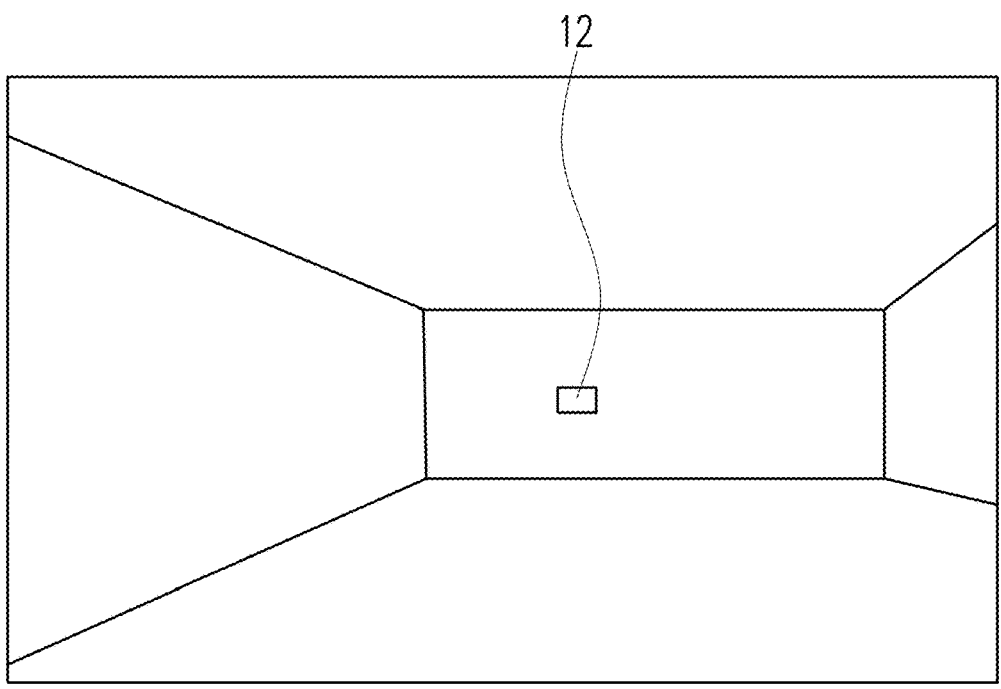
FIG. 9 is a schematic diagram of sensing a first object to be captured according to an embodiment of the disclosure.
Figure 10:
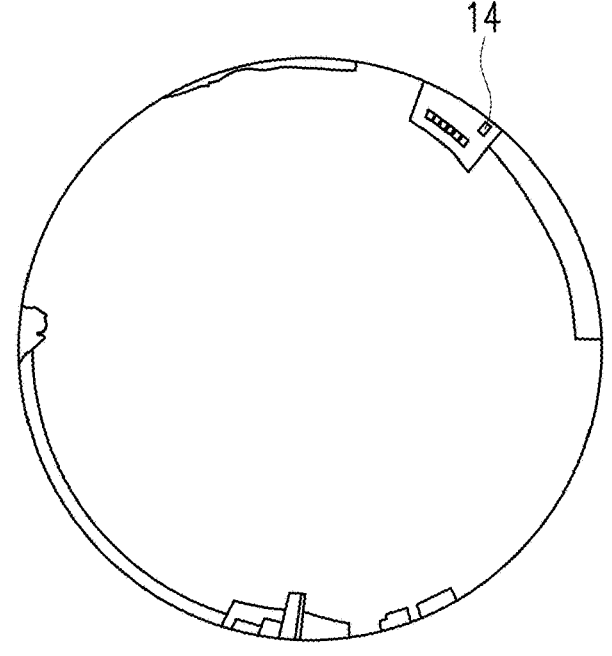
FIG. 10 is a schematic diagram of sensing a second object to be captured according to an embodiment of the disclosure.
Figure 11:
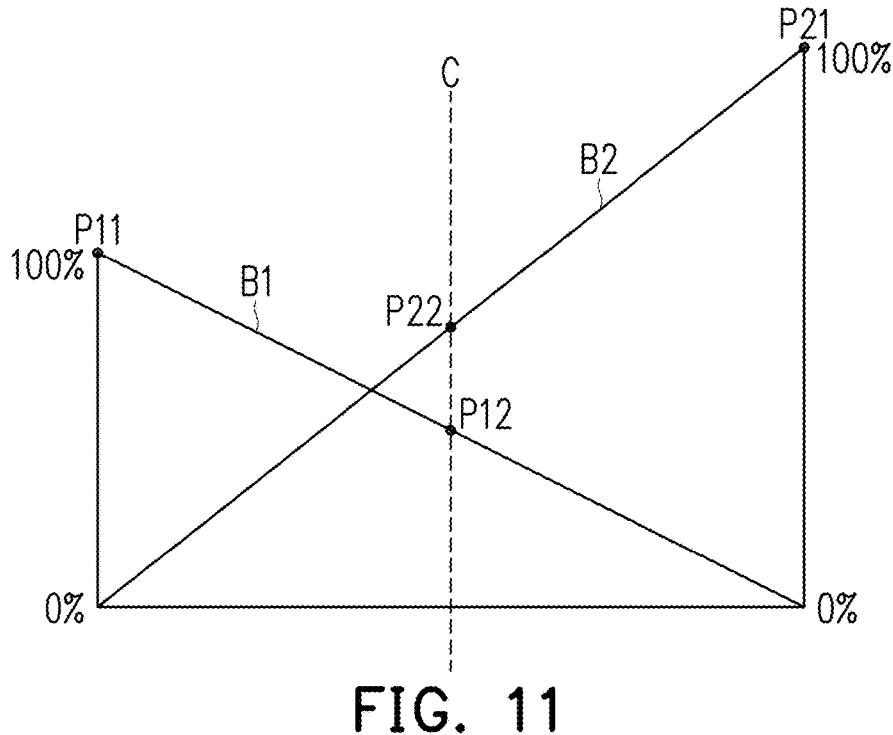
FIG. 11 is a schematic diagram of current matching of the first light-emitting module and the second light-emitting module according to an embodiment of the disclosure.

FIG. 9 is a schematic diagram of sensing a first object to be captured according to an embodiment of the disclosure. FIG. 10 is a schematic diagram of sensing a second object to be captured according to an embodiment of the disclosure. Referring to FIG. 1 and FIG. 8 to FIG. 10 at the same time, after the above step S202, step S203 is executed to generate an adjustment signal according to the image signal. Specifically, the control module may calculate the required adjustment signal in an arithmetic manner according to the image signal, where the adjustment signal is related to current magnitude matching of the first light-emitting module 120 and the second light-emitting module 130, as shown in FIG. 11. In detail, in the step, it may further include a step of sensing an area in the image signal with a viewing angle less than 30 degrees to obtain a first brightness signal, a step of sensing an area in the image signal with a viewing angle greater than 150 degrees to obtain a second brightness signal, and a step of generating the adjustment signal according to the first brightness signal and the second brightness signal. For example, the first object to be captured 12 may be first configured in an environment corresponding to an area with the viewing angle being less than 30 degrees (i.e., an area close to a center of the screen), and the second object to be captured 14 may be configured in an environment corresponding to an area with the viewing angle being greater than 150 degrees (i.e., an area close to an edge of the screen). Where, the first object to be captured 12 and the second object to be captured 14 may be both white objects, such as white paper. In some embodiments, the first object to be captured 12 may be the same as the second object to be captured 14. Then, the image capturing module 140 is used to sense the maximum brightness of the first object to be captured 12 to obtain a first brightness signal, and to sense the maximum brightness of the second object to be captured 14 to obtain a second brightness signal. The first brightness signal is related to the maximum brightness of the first object to be captured 12 illuminated by the illumination beam, and the second brightness signal is related to the maximum brightness of the second object to be captured 14 illuminated by the illumination beam. In other words, the image signal includes the maximum brightness information of the first object to be captured 12 and the maximum brightness information of the second object to be captured 14.

Finally, after the above steps, step S204 is executed to adjust a current of the first light-emitting module 120 and a current of the second light-emitting module 130 according to the adjustment signal. In this way, the image capturing device 100 may control the light-emitting effect according to different usage scenarios to maintain good image capturing quality. In addition, in some embodiments, the image capturing device 100 may continue to execute steps S202 to 204 according to an actual situation to continuously optimize the illumination beam, thereby maintaining good image capturing quality.

Figure 12:
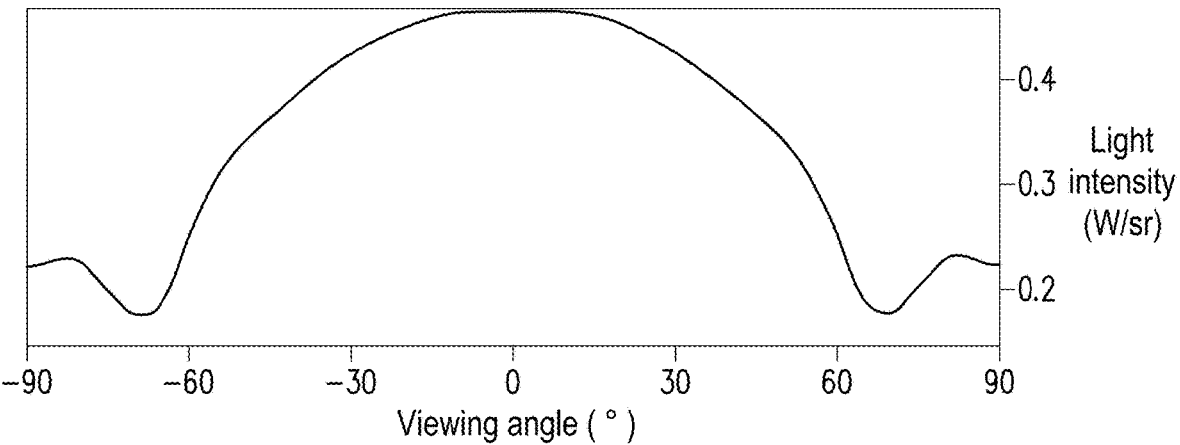
FIG. 12 is a light intensity curve diagram of the first light beam and the second light beam after mixing.

FIG. 11 is a schematic diagram of current matching of the first light-emitting module and the second light-emitting module according to an embodiment of the disclosure. FIG. 12 is a light intensity curve diagram of the first light beam and the second light beam after mixing. Refer to FIG. 8, FIG. 11 and FIG. 12. It should be noted that in any step from step S201 to step S204, for example, before activating the light-emitting modules, or during the period of adjusting the currents of the light-emitting modules, the respective current matching methods of the first light-emitting module 120 and the second light-emitting module 130 may be selected according to different situations to achieve different light mixing effects, so as to further improve the adjustment quality. For example, in the embodiment, a matching reference line C in the current matching schematic diagram shown in FIG. 11 may be used as activating current matching of the first light-emitting module 120 and the second light-emitting module 130. A line segment B1 shown in FIG. 11 represents a current magnitude corresponding to a current percentage of the first light-emitting module 120, and a line segment B2 represents a current magnitude corresponding to a current percentage of the second light-emitting module 130. When the line segment B1 or the line segment B2 is at the highest position, it represents the maximum operating current of the first light-emitting module 120 or the second light-emitting module 130 (i.e., a percentage of the maximum operating current is 100%). When the line segment B1 or the line segment B2 is at the lowest position, it represents the minimum operating current of the first light-emitting module 120 or the second light-emitting module 130 (i.e., the percentage of the maximum operating current is 0%). In FIG. 11, a reference point P11 is expressed as activating the first light-emitting module 120 at 100% of the maximum operating current of the first light-emitting module 120, and a reference point P21 is expressed as activating the second light-emitting module 130 at 100% of the maximum operating current of the second light-emitting module 130. In other words, in the embodiment, the maximum operating current of the second light-emitting module 130 is designed to be greater than the maximum operating current of the first light-emitting module 120, as shown in FIG. 11, but the disclosure is not limited thereto. In the embodiment, for example, the matching reference line C that simultaneously passes through a reference point P12 (i.e. a position of 50% of the maximum operating current of the first light-emitting module 120) and a reference point P22 (i.e. a position of 50% of the maximum operating current of the second light-emitting module 130) is used as the respective current matching methods of the first light-emitting module 120 and the second light-emitting module 130. Namely, in this situation, the currents that activate the first light-emitting module 120 with 50% of the maximum operating current of the first light-emitting module 120 and activate the second light-emitting module 130 with 50% of the maximum operating current of the second light-emitting module 130 are matched, and the generated first light beam and the second light beam are mixed to form an optimized light intensity curve as shown in FIG. 12. In different embodiments, matching reference lines at other positions may be selected as the respective current matching of the first light-emitting module 120 and the second light-emitting module 130 according to different situations, which is not limited by the disclosure. In addition, in different embodiments, the current magnitude matching of the first light-emitting module 120 and the second light-emitting module 130 may be designed so that the sum of the currents of the first light-emitting module 120 and the second light-emitting module 130 is not equal to 100% of the maximum operating current, which is not limited by the disclosure. Therefore, before activating the light-emitting modules, or after the control module performs calculation based on the aforementioned image signal, an optimized light intensity distribution may be generated, thereby obtaining the required matching current magnitude of the first light-emitting module 120 and the second light-emitting module 130.

In summary, in the image capturing device and its adjustment method of the disclosure, the image capturing device includes the substrate, the first light-emitting module, the second light-emitting module, the image capturing module and the control module. The first light-emitting module is configured to provide the first light beam with the first brightness distribution, the second light-emitting module is configured to provide the second light beam with the second brightness distribution, and the control module is electrically connected to the first light-emitting module, the second light-emitting module, and the image capturing module, and configured to generate the adjustment signal based on the image signal captured by the image capturing module, and adjust the current of the first light-emitting module and the current of the second light-emitting module based on the adjustment signal, so as to form the optimized illumination beam to control a light-emitting effect of the image capturing device. In this way, the light-emitting effect may be controlled according to different usage scenarios to maintain good image capturing quality.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An image capturing device, comprising:

a substrate;

a first light-emitting module, disposed on the substrate, and configured to provide a first light beam with a first brightness distribution;

a second light-emitting module, disposed on the substrate, and configured to provide a second light beam with a second brightness distribution;

an image capturing module, configured to capture an environmental image illuminated by an illumination beam to obtain an image signal, wherein the illumination beam comprises the first light beam and the second light beam; and a control module, electrically connected to the first light-emitting module, the second light-emitting module, and the image capturing module, and configured to generate an adjustment signal, and adjust a current of the first light-emitting module and a current of the second light-emitting module according to the adjustment signal, wherein in the first brightness distribution, an average brightness of a viewing angle being less than or equal to 60 degrees is less than an average brightness of a viewing angle being greater than 60 degrees, and in the second brightness distribution, the average brightness of the viewing angle being less than or equal to 60 degrees is greater than the average brightness of the viewing angle being greater than 60 degrees.

2. The image capturing device as claimed in claim 1, wherein the first light-emitting module comprises a plurality of first light-emitting elements and a plurality of reflective elements, and the plurality of reflective elements are respectively located between the plurality of first light-emitting elements and a center point position of the image capturing device.

3. The image capturing device as claimed in claim 2, wherein extending directions of long sides of the plurality of reflective elements are perpendicular to directions along which the plurality of first light-emitting elements are connected to the center point position of the image capturing device.

4. The image capturing device as claimed in claim 2, wherein a width of the plurality of reflective elements is five times greater than a width of the plurality of first light-emitting elements.

5. The image capturing device as claimed in claim 2, wherein a distance from a side of the plurality of reflective elements adjacent to the substrate to a center of the corresponding plurality of first light-emitting elements is less than a width of the plurality of first light-emitting elements.

6. The image capturing device as claimed in claim 2, wherein each of the plurality of reflective elements comprises a first reflective surface and a second reflective surface connected with each other, the first reflective surface is located between the substrate and the second reflective surface, and a first included angle between the first reflective surface and a reference plane parallel to the substrate is greater than a second included angle between the second reflective surface and the reference plane.

7. The image capturing device as claimed in claim 6, wherein the first reflective surface and the second reflective surface are both planes.

8. The image capturing device as claimed in claim 6, wherein the first included angle falls between 55 degrees and 85 degrees, and the second included angle falls between 40 degrees and 70 degrees.

9. The image capturing device as claimed in claim 6, wherein a minimum distance from a side of the first reflective surface away from the substrate to the substrate is greater than a height of the plurality of first light-emitting elements and less than twice the height of the plurality of first light-emitting elements, and a minimum distance from a side of the second reflective surface away from the substrate to the substrate is greater than twice the height of the plurality of first light-emitting elements.

10. The image capturing device as claimed in claim 1, wherein the second light-emitting module comprises a plurality of second light-emitting elements, and the plurality of second light-emitting elements are off-axis light-emitting diodes.

11. The image capturing device as claimed in claim 1, wherein a maximum light-emitting intensity of light-emitting elements in the first light-emitting module is less than a maximum light-emitting intensity of light-emitting elements in the second light-emitting module.

12. The image capturing device as claimed in claim 1, further comprising:

a gravity sensing element, disposed on the substrate, and configured to sense an installation state of the image capturing device to obtain an installation signal, wherein the control module generates a first activation signal and a second activation signal according to the installation signal, and then respectively activates the first light-emitting module and the second light-emitting module according to the first activation signal and the second activation signal.

13. An adjustment method of an image capturing device, comprising:

installing the image capturing device, wherein the image capturing device comprises a substrate, a first light-emitting module, a second light-emitting module, an image capturing module, and a control module;

activating the first light-emitting module and the second light-emitting module to respectively provide a first light beam with a first brightness distribution and a second light beam with a second brightness distribution, so as to form an illumination beam, wherein in the first brightness distribution, an average brightness of a viewing angle being less than or equal to 60 degrees is less than an average brightness of a viewing angle being greater than 60 degrees, and in the second brightness distribution, the average brightness of the viewing angle being less than or equal to 60 degrees is greater than the average brightness of the viewing angle being greater than 60 degrees;

capturing an environmental image illuminated by the illumination beam to obtain an image signal;

generating an adjustment signal according to the image signal; and adjusting a current of the first light-emitting module and a current of the second light-emitting module according to the adjustment signal.

14. The adjustment method of an image capturing device as claimed in claim 13, wherein the step of activating the first light-emitting module and the second light-emitting module to respectively provide the first light beam and the second light beam to form the illumination beam further comprises:

sensing an installation state of the image capturing device to obtain an installation signal;

generating a first activation signal and a second activation signal according to the installation signal; and respectively activating the first light-emitting module and the second light-emitting module according to the first activation signal and the second activation signal.

15. The adjustment method of an image capturing device as claimed in claim 14, wherein the step of generating the first activation signal and the second activation signal according to the installation signal further comprises:

analysing the installation signal to generate inclination information of the image capturing device; and determining the first activation signal and the second activation signal based on the inclination information of the image capturing device, wherein the first activation signal is related to a percentage of a maximum operating current of the first light-emitting module, and the second activation signal is related to a percentage of a maximum operating current of the second light-emitting module.

16. The adjustment method of an image capturing device as claimed in claim 13, wherein the step of generating the adjustment signal according to the image signal further comprises:

sensing an area in the image signal with a viewing angle less than 30 degrees to obtain a first brightness signal;

sensing an area in the image signal with a viewing angle greater than 150 degrees to obtain a second brightness signal; and generating the adjustment signal based on the first brightness signal and the second brightness signal.

17. The adjustment method of an image capturing device as claimed in claim 16, wherein the step of sensing a maximum brightness of the area in the image signal with the viewing angle less than 30 degrees as the first brightness signal and sensing a maximum brightness of the area in the image signal with the viewing angle greater than 150 degrees as the second brightness signal further comprises:

configuring a first object to be captured in an environment corresponding to the area with the viewing angle less than 30 degrees;

configuring a second object to be captured in an environment corresponding to the area with the viewing angle greater than 150 degrees;

sensing a maximum brightness of the first object to be captured to obtain the first brightness signal; and sensing a maximum brightness of the second object to be captured to obtain the second brightness signal.

18. The adjustment method of an image capturing device as claimed in claim 17, wherein the first object to be captured and the second object to be captured are both white objects, and the first object to be captured is the same as the second object to be captured.

19. The adjustment method of an image capturing device as claimed in claim 17, wherein the first brightness signal is related to the maximum brightness of the first object to be captured illuminated by the illumination beam, and the second brightness signal is related to the maximum brightness of the second object to be captured illuminated by the illumination beam.

20. An image capturing device, comprising:

a substrate;

a first light-emitting module, disposed on the substrate, and configured to provide a first light beam with a first brightness distribution;

a second light-emitting module, disposed on the substrate, and configured to provide a second light beam with a second brightness distribution;

an image capturing module, configured to capture an environmental image illuminated by an illumination beam to obtain an image signal, wherein the illumination beam comprises the first light beam and the second light beam; and a control module, electrically connected to the first light-emitting module, the second light-emitting module, and the image capturing module, and configured to generate an adjustment signal, and adjust a current of the first light-emitting module and a current of the second light-emitting module according to the adjustment signal, wherein each of the plurality of reflective elements comprises a first reflective surface and a second reflective surface connected with each other, the first reflective surface is located between the substrate and the second reflective surface, and a first included angle between the first reflective surface and a reference plane parallel to the substrate is greater than a second included angle between the second reflective surface and the reference plane.

* * * * *